US012673663B2

(12) United States Patent
Lefevre

(10) Patent No.: US 12,673,663 B2
(45) Date of Patent: Jul. 7, 2026

(54) METHOD AND SYSTEM FOR CONTROLLING A HYBRID MOTOR VEHICLE DURING DECELERATIONS

(71) Applicant: HORSE POWERTRAIN SOLUTIONS, S.L.U., Alcobendas (ES)

(72) Inventor: Aurelien Lefevre, Guyancourt (FR)

(73) Assignee: HORSE POWERTRAIN SOLUTIONS, S.L.U., Madrid (ES)

( * ) Notice: Subject to any disclaimer, the term of this patent is extended or adjusted under 35 U.S.C. 154(b) by 23 days.

(21) Appl. No.: 18/875,395

(22) PCT Filed: Jun. 16, 2023

(86) PCT No.: PCT/EP2023/066311
§ 371 (c)(1),
(2) Date: Dec. 16, 2024

(87) PCT Pub. No.: WO2023/242423
PCT Pub. Date: Dec. 21, 2023

(65) Prior Publication Data
US 2025/0381948 A1 Dec. 18, 2025

(30) Foreign Application Priority Data
Jun. 17, 2022 (FR) ...................................... 2205947

(51) Int. Cl.
*B60W 20/14* (2016.01)
*B60W 20/17* (2016.01)
(Continued)

(52) U.S. Cl.
CPC ............ *B60W 20/14* (2016.01); *B60W 20/17* (2016.01); *B60W 30/20* (2013.01);
(Continued)

(58) Field of Classification Search
CPC ...... B60W 20/14; B60W 20/17; B60W 30/20; B60W 2030/206; B60W 2510/0638; B60W 2510/244; B60W 2710/0644
See application file for complete search history.

(56) References Cited

U.S. PATENT DOCUMENTS 9,566,976 B2 * 2/2017 Fujishiro ............... B60W 10/08
10,479,188 B2 11/2019 Fremau et al.
(Continued)

FOREIGN PATENT DOCUMENTS

EP 3725616 A1 10/2020
FR 3022495 A1 12/2015
WO 2012031695 A1 3/2012

OTHER PUBLICATIONS

International Search Report from corresponding PCT Application No. PCT/EP2023/066311, mailed Sep. 7, 2023.
(Continued)

*Primary Examiner* — Erick R Solis
(74) *Attorney, Agent, or Firm* — Workman Nydegger

(57) ABSTRACT

A method for controlling a hybrid motor vehicle includes a disengageable combustion engine, involving the following steps: the power absorbed by the main electric machine to meet the target torque required at the wheels is determined, the electrical power to be expended by the second electric machine to meet the target torque required at the wheels is determined by subtracting the power absorbed by the main electric machine from the charging capacity of the traction battery, a gross value is determined for the minimum speed of rotation of the combustion engine, as a function of the electrical power to be expended by the second electric machine, and a setpoint for the minimum speed of rotation of the combustion engine is determined from the minimum
(Continued)

speed of rotation of the combustion engine as a function of positive and negative gradients.

5 Claims, 1 Drawing Sheet

(51) Int. Cl.
  *B60W 30/20* (2006.01)
  *B60W 50/00* (2006.01)
(52) U.S. Cl.
  CPC ................. *B60W 2030/206* (2013.01); *B60W 2050/0026* (2013.01); *B60W 2050/0039* (2013.01); *B60W 2510/0638* (2013.01); *B60W 2510/244* (2013.01); *B60W 2520/30* (2013.01); *B60W 2710/0644* (2013.01)

(56) References Cited

U.S. PATENT DOCUMENTS

| | | | |
|---|---|---|---|
| 2016/0236671 A1* | 8/2016 | Imamura ............... | B60W 20/14 |
| 2021/0162979 A1 | 6/2021 | Ariyoshi et al. | |
| 2022/0363239 A1* | 11/2022 | Hoshi ................... | B60W 20/14 |
| 2024/0336250 A1* | 10/2024 | Kontopoulos ........ | B60W 10/06 |

OTHER PUBLICATIONS

Search Report from corresponding French Application No. 2205947, Jan. 13, 2023.

* cited by examiner

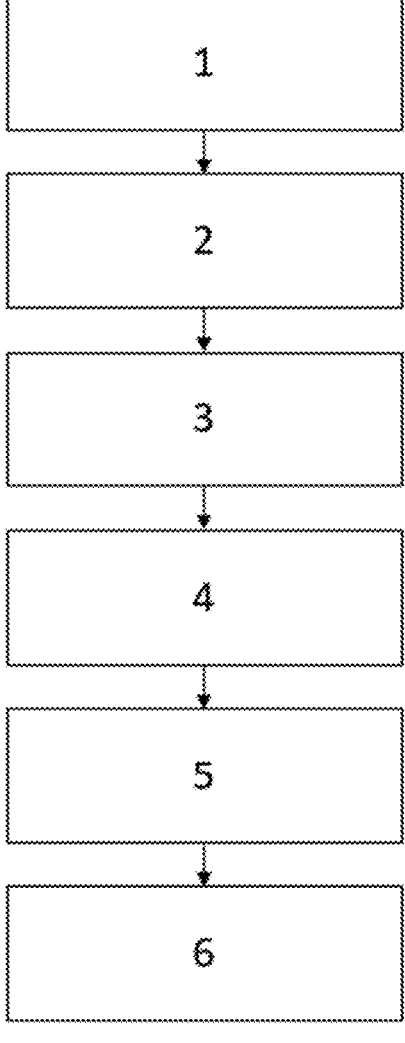

METHOD AND SYSTEM FOR CONTROLLING A HYBRID MOTOR VEHICLE DURING DECELERATIONS

TECHNICAL FIELD

The invention relates to the control of a hybrid vehicle equipped with a combustion engine and at least one electric machine, and more particularly to the control of such a vehicle during regenerative braking.

A hybrid vehicle comprising a transmission enabling a 100% electric mode of operation is defined as comprising:

at least one electric machine, known as an electric traction machine, connected to the wheels and a combustion engine that can be decoupled from the wheels and switched off (without combustion or fuel injection).

Publication FR3022495A1 in the name of the applicant describes such an architecture.

A 100% electric mode of operation involves decoupling the combustion engine from the wheels, which means that most of the vehicle's kinetic energy can be recovered during deceleration of the vehicle. With the combustion engine uncoupled, it does not dissipate energy through its idle drive and the resulting friction.

This mode of operation is preferred during deceleration for the associated energy savings and for reasons of driving pleasure.

Such a 100% electric deceleration mode also enables "regenerative" braking. In addition, by coupling the combustion engine to the wheels and controlling it without injecting fuel, the vehicle can be braked by dissipating some of the energy. This type of braking is generally known as "engine braking" and is commonly used in combustion vehicles.

However, during certain phases of the vehicle's journey, the battery may no longer be able to recover the vehicle's kinetic energy, due to its charge level. In other words, regenerative braking is not possible because the battery is full. The vehicle then has only the braking provided by the dedicated braking system, which presents a significant and therefore undesirable driving inconvenience.

In other words, according to the state of the art on such hybrid vehicles, when decelerating in all-electric mode at a time when the battery is already full, there is no longer any engine braking, and the only way to decelerate the vehicle is by mechanical action on the braking system (voluntary application of the brake pedal by the driver).

This type of problem can also occur when the battery is too cold or when a malfunction limits its recharging capacity.

A solution to this problem, known from the state of the art as described in FR3022495A1, more particularly based on an architecture with two electric machines, consists in selecting another particular state of the drive train, commonly called "series hybrid" and defined as being a mode in which:

at least one first electric machine, known as the "traction electric machine", is connected to the wheels, and a second electric machine is not connected to the wheels, the combustion engine is switched on, controlled in injection cut-off mode and connected to the second electric machine the electric traction machine regenerates the vehicle's kinetic energy into electrical energy, for the following purposes the battery by charging it, electrical consumers via a power supply to the latter and the second electric machine connected to the combustion engine The second electric machine is powered to rotate the combustion engine when injection is cut off, so as to dissipate electrical energy into mechanical energy through the friction of the combustion engine. In this way, the energy that cannot be recovered by the battery or the electrical accessories can be dissipated to ensure that the vehicle decelerates by means of regenerative braking.

As this energy to be expended by the electric machine may be greater or lesser depending on the battery's capacity to recover energy and the driver's wishes, it is then necessary to adapt the operating point of the combustion engine and the second electric machine in order to expend only the necessary energy. As this operating point is limited to the speed of rotation, as the combustion engine can only make its losses, it is then necessary to calculate the minimum speed of rotation to meet the vehicle's desired deceleration requirement.

There remains a technical problem to be solved in calculating the speed of rotation of the combustion engine while controlling the associated noise and vibration harshness (NVH).

PRIOR ART

Prior art includes EP 3 725 616, which describes the calculation of a target speed and its trajectory for a hybrid vehicle in which the combustion engine and the electric machine are connected to the wheel as a function of a desired recharge level.

EXPLANATION OF THE INVENTION

The invention relates to a method of controlling a motor vehicle comprising a combustion engine, a first electric machine and a second electric machine, the combustion engine being connected to the wheels by a disengageable connection and to the second electric machine by a connection that can also be disengaged, the electric machines being electrically connected to a battery, the control method comprising the following steps:

the driver's torque requirement is determined, the power absorbed by the main electric machine to meet the target torque required at the wheels is determined, the electrical power that must be expended by the second electric machine to meet the target torque required at the wheels is determined by subtracting the power absorbed by the main electric machine from the charging capacity of the traction battery, the equivalent mechanical power to be produced by the second electric machine is determined as a function of the electrical power to be expended by the second electric machine and the average electrical efficiency value from mechanical power, a gross value is determined for the minimum rotation speed of the combustion engine, modelled by a linear model of the power losses of the combustion engine as a function of the equivalent mechanical power to be produced by the second electric machine, and a minimum engine rotation speed setpoint is determined from the minimum engine rotation speed as a function of positive and negative gradients.

The gross value of the minimum rotation speed of the combustion engine can be limited to a maximum authorised rotation speed of the combustion engine for decelerations to take account of vibration constraints.

The following sub-steps can be carried out to determine the gross minimum rotation speed setpoint of the combustion engine:

a minimum rotation speed differential of the combustion engine is determined as being equal to the difference between the minimum rotation speed of the combustion engine and the gross minimum rotation speed setpoint of the combustion engine, a Boolean status value is determined as a function of a comparison between the minimum rotation speed of the combustion engine and a rotation speed threshold for a minimum duration, a positive gradient is determined as a function of a first predetermined table receiving as input the minimum rotation speed differential of the combustion engine and as a function of said Boolean state value, a negative gradient is determined as a function of a second predetermined table receiving as input the minimum rotation speed differential of the combustion engine and as a function of said Boolean state value, and the gross minimum rotation speed setpoint of the combustion engine is then determined as a function of the positive gradient, the negative gradient and the minimum rotation speed of the combustion engine.

The minimum rotation speed setpoint of the combustion engine can be determined as the minimum value between the gross minimum rotation speed setpoint of the combustion engine and the maximum authorised rotation speed of the combustion engine for decelerations.

Another object of the invention is a control system for a motor vehicle comprising a combustion engine, a first electric machine and a second electric machine, the combustion engine being connected to the wheels by a disengageable connection and to the second electric machine by a connection that can also be disengaged, the electric machines being electrically connected to a battery, the control system being characterised by the fact that it comprises a sensor for measuring the target torque required at the wheels, a sensor for measuring the charge capacity of the traction battery, calculation means and memories configured to execute the control method as described above.

BRIEF DESCRIPTION OF THE DRAWINGS

Other purposes, features and advantages of the invention will become apparent from the following description, which is given solely by way of non-limiting example and is made with reference to the appended drawings in which:

FIG. 1 illustrates the main stages of a control process according to the invention,

DETAILED DESCRIPTION

The aim of the control process is to define a minimum engine rotation speed in order to respond to the driver's wishes during the deceleration phase, while controlling the development and level of this rotation speed in order to limit the impact on NVH (Noise Vibration and Harshness) performance.

The following variables are introduced:

WHL_TQ_TG: target torque required at the wheels, based on the driver's request and the third-party functions that have an impact on its development (cruise control, autonomous driving, etc.).

WHEEL_EL_POW_TG: power absorbed by the main electric machine

EM_SND_EL_POW: electrical power to be expended by the second electric machine

BAT_TRAC_CHRG_POW: traction battery charge capacity

EM_SND_MECA_POW: equivalent mechanical power to be produced by the second electric machine\

EM_SND_MOT_EFY_FAC: average value of electrical efficiency from mechanical power ENG_MIN_SPD_RAW: gross value of the minimum rotation speed of the combustion engine ENG_MIN_SPD_RAW_TG: gross minimum rotation speed setpoint of the combustion engine ENG_MAX_AUTH_SPD: maximum permissible rotation speed of the combustion engine for deceleration, which may be dependent on speed, lever position or other HMI (human machine interface) that has an impact on the level of vehicle deceleration.

ENG_MIN_SPD_TG: Minimum rotation speed setpoint of the combustion engine for the rest of the arbitrations having an impact on the choice of final engine speed of the combustion engine in a series hybrid state.

ENG_MIN_SPD: minimum rotation speed of the combustion engine.

Sequentially, the control method according to the invention allows:

calculating the electrical power produced by the electric traction machine in response to the "driver's wish" (the driver's wish corresponds to a desire for vehicle acceleration, which is translated by a computer into a power/torque setting at the wheel), calculating the electrical power to be dissipated by the second electric machine connected to the combustion engine in order to dissipate the electrical power that could not be absorbed by the battery or the electrical accessories, calculating the associated mechanical power, and defining the minimum speed of rotation of the combustion engine required to dissipate the above mechanical power.

The control process is illustrated in FIG. 1.

In a first step 1, the power absorbed by the main electric machine WHEEL_EL_POW_TG (expressed in Watts) is determined in order to meet the target torque required at the wheels WHL_TQ_TG. This function is calculated using a 2nd order polynomial model of electrical consumption:

$$WHEEL\_EL\_POW\_TG = P0 + P1 * WHL\_TQ\_TG * \qquad \text{[Math 1]}$$
$$RAT\_EM + P2 * (WHL\_TQ\_TG * RAT\_EM)^2$$

With:

RAT_EM: a gear ratio between the main electric traction machine and the wheel,

P0 (expressed in Watts): static losses of the main machine, generally a function of speed and battery voltage, P1 (expressed in W/Nm): a first-order coefficient of the main machine's power consumption, generally a function of the speed of rotation and the battery voltage, P2 (expressed in W/Nm$^2$): a coefficient of order 2 of the main machine's electricity consumption, generally a function of the speed of rotation and the battery voltage.

In a second step 2, the power absorbed by the main electric machine WHEEL_EL_POW_TG is subtracted from the charging capacity of the traction battery BAT_TRAC_CHRG_POW in order to determine the electrical power that must be expended by the second electric machine EM_SND_EL_POW to meet the target torque required at the wheels and the associated electrical power:

$$EM\_SND\_EL\_POW = \qquad \text{[Math 2]}$$
$$BAT\_TRAC\_CHRG\_POW - WHEEL\_EL\_POW\_TG$$

In a third step 3, the electrical power to be expended by the second electric machine EM_SND_EL_POW is converted into the equivalent mechanical power EM_SND_MECA_POW to be produced by the secondary electric machine.

$$EM\_SND\_MECA\_POW = \qquad \text{[Math 3]}$$
$$EM\_SND\_EL\_POW/EM\_SND\_MOT\_EFY\_FAC$$

With: EM_SND_MOT_EFY_FAC the average electrical efficiency value from mechanical power (parameterisable value).

In a fourth step 4, the gross value of the minimum rotation speed of the combustion engine ENG_MIN_SPD_RAW, modelled by a linear model of the power losses of the combustion engine as being equal to the equivalent mechanical power to be produced by the second electric machine EM_SND_MECA_POW, is determined.

$$ENG\_MIN\_SPD\_RAW = \qquad \text{[Math 4]}$$
$$\frac{(EM\_SND\_MECA\_POW - P0\_ENG\_LOSS\_POW)}{P1\_ENG\_LOSS\_POW}$$

With:

P0_ENG_LOSS_POW (expressed in Watts): the coefficient of order 0 of the combustion engine loss power, this coefficient may be a function of the combustion engine coolant temperature.

P1_ENG_LOSS_POW (expressed in W/RPM, RPM for "Rotation Per Minute"): the first-order coefficient of thermal engine loss power, which may be a function of the thermal engine coolant temperature.

As the gross value of the minimum rotation speed of the combustion engine ENG_MIN_SPD_RAW can be subject to wide variations, it is consolidated with a maximum authorised rotation speed of the combustion engine for decelerations ENG_MAX_AUTH_SPD to take account of NVH vibration constraints. This limits the minimum rotation speed of the combustion engine ENG_MIN_SPD to the maximum rotation speed of the combustion engine ENG_MAX_AUTH_SPD allowed for decelerations:

$$ENG\_MIN\_SPD = \qquad \text{[Math 5]}$$
$$MIN(ENG\_MIN\_SPD\_RAW; ENG\_MAX\_AUTH\_SPD)$$

In a fifth step 5, a minimum rotation speed setpoint of the combustion engine ENG_MIN_SPD_TG is determined from the minimum rotation speed of the combustion engine ENG_MIN_SPD.

During this stage, the dynamic evolution of the gross setpoint is managed by authorising maximum gradients so as not to have a jump in rotation speed that would be undesirable for the customer service from an acoustic and vibration (NVH) point of view, while guaranteeing high dynamics if required.

To determine the gross minimum rotation speed setpoint of the combustion engine for braking ENG_MIN_SPD_RAW_TG, the following sub-steps are carried out:

A minimum rotation speed differential of the combustion engine ENG_MIN_SPD_DIF is determined as being equal to the difference between the minimum rotation speed of the combustion engine ENG_MIN_SPD and the gross minimum rotation speed setpoint of the combustion engine ENG_MIN_SPD_RAW_TG.

$$ENG\_MIN\_SPD\_DIF = \qquad \text{[Math 6]}$$
$$ENG\_MIN\_SPD\_RAW\_TG - ENG\_MIN\_SPD$$

A Boolean status value is determined, taking a first value if the minimum rotation speed of the combustion engine ENG_MIN_SPD is less than a rotation speed threshold ENG_MIN_AL_THD for a minimum duration ENG_MIN_AL_DLY, and taking a second value in other cases.

A positive gradient ENG_MIN_SPD_POS_SLOPE_AUTH is determined as a function of a first predetermined table receiving as input the differential of minimum rotation speed of the combustion engine ENG_MIN_SPD_DIF and of said Boolean state value. The positive gradient value is that of the table if the Boolean status value has taken the second value and a parameterisable value if the Boolean status value has taken the first value, this parameterisable value usually being parameterised with a very large positive value.

A negative gradient ENG_MIN_SPD_NEG_SLOPE_AUTH is determined as a function of a second predetermined table receiving as input the differential of minimum speed of rotation of the combustion engine ENG_MIN_SPD_DIF and said Boolean state value. The negative gradient value is that of the table if the Boolean state value has taken the second value and a parameterisable value if the Boolean state value has taken the first value, this parameterisable value usually being parameterised with a very large negative value.

The gross minimum rotation speed setpoint of the combustion engine ENG_MIN_SPD_RAW_TG is then determined as a function of the positive gradient ENG_MIN_SPD_POS_SLOPE_AUTH, the negative gradient ENG_MIN_SPD_NEG_SLOPE_AUTH and the minimum rotation speed of the combustion engine ENG_MIN_SPD.

This logic makes it possible to return to the minimum rotation speed of the combustion engine ENG_MIN_SPD at the end of the process, while controlling its evolution when a higher value than the one usually obtained on serial hybrid states is not required, in order to allow the combustion engine to return to a neutral rotation speed from an acoustic and vibration point of view NVH for the customer.

The gross minimum rotation speed setpoint of the combustion engine ENG_MIN_SPD_RAW_TG is then consolidated in a sixth step 6 by the maximum authorised rotation speed of the combustion engine for decelerations ENG_MAX_AUTH_SPD to comply with NVH noise and vibration constraints. The minimum rotation speed setpoint of the combustion engine ENG_MIN_SPD_TG is then determined as being equal to the minimum value between the gross minimum rotation speed setpoint of the combustion engine ENG_MIN_SPD_RAW_TG and the maximum authorised rotation speed of the combustion engine for decelerations ENG_MAX_AUTH_SPD.

A minimum target rotation speed for the combustion engine has been developed to enable the target torque required at the wheels to be met during deceleration with low battery recharging potential, while at the same time controlling the associated NVH issues to guarantee the vehicle's performance.

The invention claimed is:

1. A method for controlling a motor vehicle comprising a combustion engine, a first electric machine and a second electric machine, the combustion engine being connected to the wheels by a disengageable connection and to the second electric machine by a connection that can also be disengaged, the electric machines being electrically connected to a battery, the control method comprising the following steps:

the driver's torque requirement is determined, the power absorbed by the main electric machine to meet the target torque required at the wheels is determined, the electrical power to be expended by the second electric machine to meet the target torque required at the wheels is determined by subtracting the power absorbed by the main electric machine from the charging capacity of the traction battery, the equivalent mechanical power to be produced by the second electric machine is determined as a function of the electrical power to be expended by the second electric machine and the average electrical efficiency value from mechanical power, a gross value is determined for the minimum rotation speed of the combustion engine, modelled by a linear model of the power losses of the combustion engine as a function of the equivalent mechanical power to be produced by the second electric machine, and a setpoint for the minimum speed of rotation of the combustion engine is determined from the minimum speed of rotation of the combustion engine as a function of positive and negative gradients.

2. The control method according to claim 1, in which the gross value of the minimum rotation speed of the combustion engine is limited to a maximum authorized rotation speed of the combustion engine for decelerations to take account of vibration constraints.

3. The control method according to claim 1, in which, in order to determine the gross setpoint for the minimum rotation speed of the combustion engine, the following sub-steps are carried out:

a minimum rotation speed differential of the combustion engine is determined as being equal to the difference between the minimum rotation speed of the combustion engine and the gross minimum rotation speed setpoint of the combustion engine, a Boolean status value is determined as a function of a comparison between the minimum rotation speed of the combustion engine and a rotation speed threshold for a minimum duration, a positive gradient is determined as a function of a first predetermined table receiving as input the minimum rotation speed differential of the combustion engine and as a function of said Boolean state value, a negative gradient is determined as a function of a second predetermined table receiving as input the minimum rotation speed differential of the combustion engine and as a function of said Boolean state value, and the gross setpoint for the minimum rotation speed of the combustion engine is then determined as a function of the positive gradient, the negative gradient and the minimum rotation speed of the combustion engine.

4. The control method according to claim 3, in which the minimum rotation speed setpoint of the combustion engine is determined as the minimum value between the gross minimum rotation speed setpoint of the combustion engine and the maximum permissible rotation speed of the combustion engine for decelerations.

5. A control system for a motor vehicle comprising a combustion engine, a first electric machine and a second electric machine, the combustion engine being connected to the wheels by a disengageable connection and to the second electric machine by a connection that can also be disengaged, the electric machines being electrically connected to a battery, the control system being wherein it comprises a sensor for measuring the target torque required at the wheels, a sensor for measuring the charge capacity of the traction battery, computing means and memories configured to execute the control method according to claim 1.

* * * * *